A. WHITING.
Machine for Raising and Floating Hides in Tan-Vats.

No. 214,220.  Patented April 8, 1879.

WITNESSES:
Henry N. Miller
C. Sedgwick

INVENTOR:
A. Whiting
BY Munn & Co
ATTORNEYS.

UNITED STATES PATENT OFFICE.

ALBERT WHITING, OF ROCHESTER, NEW YORK, ASSIGNOR TO HIMSELF AND JOSEPH A. SMITH, OF SAME PLACE.

IMPROVEMENT IN MACHINES FOR RAISING AND FLOATING HIDES IN TAN-VATS.

Specification forming part of Letters Patent No. 214,220, dated April 8, 1879; application filed February 17, 1879.

*To all whom it may concern:*

Be it known that I, ALBERT WHITING, of Rochester, in the county of Monroe and State of New York, have invented a new and useful Improvement in Machines for Raising and Floating Hides in Tan-Vats, of which the following is a specification.

Figure 1:
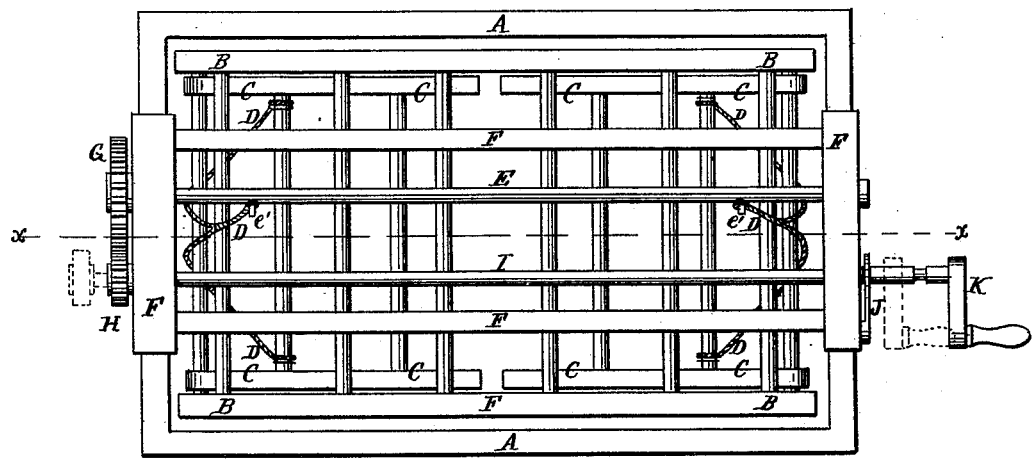
Figure 2:
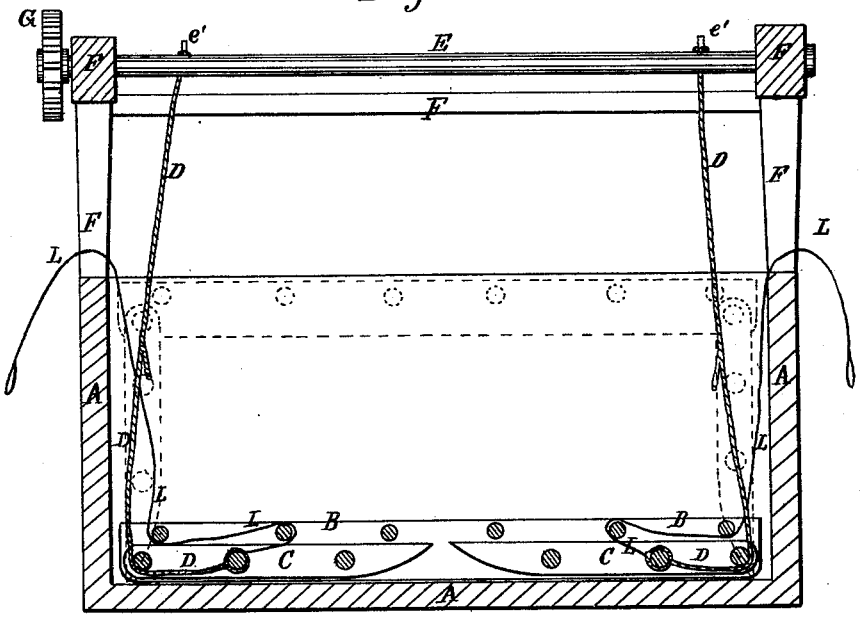

Figure 1 is a top view of my improved machine, shown as applied to a tan-vat. Fig. 2 is a vertical longitudinal section of the same.

Similar letters of reference indicate corresponding parts.

The object of this invention is to improve the construction of the machine for which Letters Patent No. 205,596 were issued July 2, 1878, to Albert Whiting and Joseph A. Smith, so as to make it more convenient and effective in use.

The invention consists in the combination of the short hinged racks with the rack that receives the hides to support the said rack and hides when raised; in the combination of the hoisting-ropes with the short hinged racks, the main rack, and the shaft of the hoisting mechanism; in the combination of the trip-ropes with the short hinged racks and the main rack; and in the combination of the locking-hook with the frame of the hoisting mechanism, and with the grooved revolving and sliding shaft, to adapt the rack to be used as a plunger for floating the hides, as hereinafter fully described.

A represents a tan-vat, in which is placed a rack or false bottom, B. The rack B is made of such a size as to move freely up and down within the vat A. To the ends of the rack B are hinged the ends of two short or half racks, C, to serve as legs to support the rack B when raised into a horizontal position. To a round of the short racks C, at a little distance from their hinged ends, are attached the ends of the hoisting-ropes D, which pass around the end rounds of the rack B, and have loops formed upon their other ends to be placed upon pins $e'$, attached to the shaft E, so that the rack B and the hides placed upon it may be raised by revolving the said shaft E. The shaft E revolves in bearings in a movable frame, F, which rests upon the edge of the vat A.

To one end of the shaft E is attached a gear-wheel, G, the teeth of which mesh into the teeth of the gear-wheel H, attached to the end of the shaft I. The shaft I is placed parallel with the shaft E, and revolves and slides in bearings in the frame F, so that the gear-wheel H may be thrown into and out of gear with the gear-wheel G by sliding the shaft I longitudinally in its bearings. The shaft I is locked in either position by a hook, J, pivoted to the frame F, and which hooks into grooves in the shaft I, as shown in Fig. 1.

To the end of the shaft I is attached a crank, K, by means of which it is revolved to revolve the shaft E. With this construction, by revolving the shaft E, the ropes D will be wound upon it, and the rack B and the hides placed upon it will be raised. As the rack B is raised the strain upon the hoisting-ropes D, owing to their passing around the end rounds of the said rack B, will draw the short frames C into an erect position, so that they will support the said rack B and the hides placed upon it.

The free ends of the side bars of the short racks C are rounded off, as shown in Fig. 2, so that when the rack B is partially raised and is then released by throwing the hoisting-gearing out of gear the lower ends of the short racks C will slide inward, and the rack B will sink to the bottom of the vat A, floating the hides and allowing the tanning-liquid to pass in and out between them, and thus supplying them with fresh tanning matter.

L L are ropes, the ends of which are attached to rounds of the short racks C at a little distance from their hinged ends, and which are passed around rounds of the rack B at a little distance from its ends, so that when the said short racks C are in an erect position, and are supporting the rack B and the hides placed upon it, by pulling upon the said ropes L the free ends of the said short racks C will be drawn inward, and the rack B and the hides placed upon it allowed to sink to the bottom of the vat A. The free ends of the ropes L may also be hooked upon the pins $e'$ of the shaft E, and used for floating the hides, if desired.

Having thus described my invention, I claim as new and desire to secure by Letters Patent—

1. The combination of the short hinged racks C with the rack B, that receives the hides, to support the said rack and hides when raised, substantially as herein shown and described.

2. The combination of the hoisting-ropes D with the short hinged racks C, the main rack B, and the shaft E of the hoisting mechanism, as herein shown and described.

3. The combination of the trip-ropes L with the short hinged racks C and the main rack B, substantially as herein shown and described.

4. The combination of the locking-hook J with the frame F of the driving mechanism, and with the grooved revolving and sliding shaft I, to adapt the rack B to be used as a plunger for floating the hides, substantially as herein shown and described.

ALBERT WHITING.

Witnesses:
C. A. VICKERY,
W. MARTIN JONES.